United States Patent

Dehlin

[11] Patent Number: 6,161,981
[45] Date of Patent: Dec. 19, 2000

[54] TURNBUCKLE

[75] Inventor: Pär Dehlin, Bromma, Sweden

[73] Assignee: All Set Marine Lashing AB, Bromma, Sweden

[21] Appl. No.: 09/254,597

[22] PCT Filed: Sep. 2, 1997

[86] PCT No.: PCT/SE97/01465

§ 371 Date: Apr. 22, 1999

§ 102(e) Date: Apr. 22, 1999

[87] PCT Pub. No.: WO98/10983

PCT Pub. Date: Mar. 19, 1998

[30] Foreign Application Priority Data

Sep. 12, 1996 [SE] Sweden ................................. 9603322

[51] Int. Cl.[7] ............................................................ F16B 7/06
[52] U.S. Cl. ............................... 403/43; 403/45; 410/100
[58] Field of Search .............................. 403/43, 44, 45, 403/46, 47, 48, 109.1; 410/100, 103

[56] References Cited

U.S. PATENT DOCUMENTS

| | | | |
|---|---|---|---|
| 1,386,109 | 8/1921 | Hatfield | 403/43 |
| 3,051,519 | 8/1962 | Sudeikis | 403/43 |
| 3,278,210 | 10/1966 | Sanders | 403/46 |
| 4,081,219 | 3/1978 | Dykmans | 403/43 |
| 4,537,388 | 8/1985 | McCabe | 403/43 X |

FOREIGN PATENT DOCUMENTS

| | | | |
|---|---|---|---|
| 10844 | 2/1903 | Austria | 403/43 |
| 133416 | 1/1976 | Norway . | |
| 151719 | 2/1985 | Norway . | |
| 411 438 | 12/1979 | Sweden . | |
| 431 106 | 12/1983 | Sweden . | |

*Primary Examiner*—Harry C. Kim
*Attorney, Agent, or Firm*—Vorys, Sater, Seymour and Pease LLP

[57] ABSTRACT

A turnbuckle comprises first and second fastening parts, the first fastening part having a first end fitting and a first rod-shaped portion, and the second fastening part having a second end fitting and a second rod-shaped portion, at least the first of which rod-shaped portions is formed with threads. The turnbuckle further comprises a tightening device comprising first and second tightening members, each having an outer end piece and an inner end piece. The outer end piece of at least the first tightening member has a threaded through-hole to receive in screw engagement the threaded rod portion of the first fastening part. The inner end piece of the second tightening member has a threaded through-hole also to receive in screw engagement the threaded rod portion of the first fastening part. The tightening device is arranged to assume at least two different elongation conditions. In a shorter condition, the inner end piece of the second tightening member is engaged with the threaded rod portion of the first fastening part. In a longer condition, the inner end piece of the second tightening member is not so engaged, but the tightening members are longitudinally displaced such that the inner end pieces of the first and second tightening members abut each other.

22 Claims, 2 Drawing Sheets

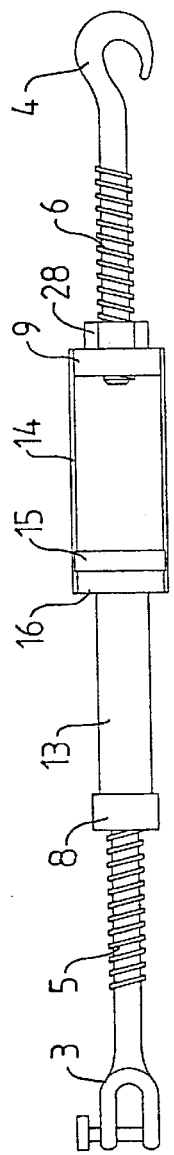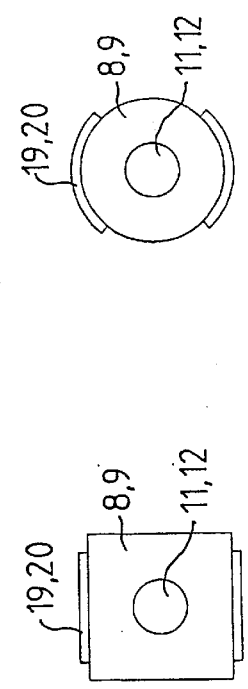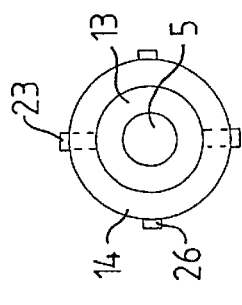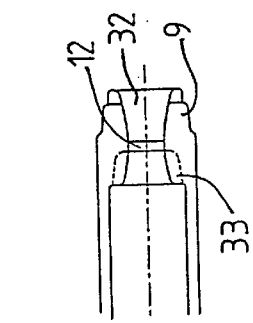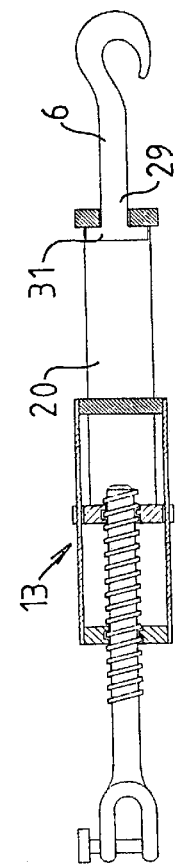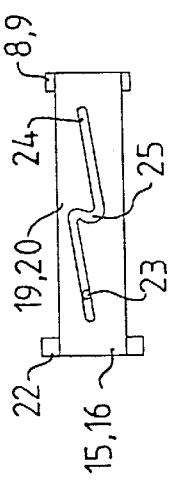

TURNBUCKLE

The subject invention is directed to a turnbuckle comprising a first and a second fastening means, each with an end fitting and a rod-shaped portion, at least one of which portions is formed with external threads, and a tightening device including a pair of outer end pieces, each piece having a through-hole therein, at least one of which is formed with threads, the threaded portion(s) of the fastening means being in screw engagement with the corresponding hole(s) in the tightening device.

More precisely, the invention relates to a so-called lashing rod of turnbuckle type designed to secure loads, preferably containers, for example to a ship's deck, said fastening means intended to be anchored by means of their end fittings in attachment elements provided respectively on the container and the ship's deck.

Instead of wires, chains and the like to lash or secure loads, such as containers, machinery, vehicles etc., to a ship's deck, lorries and the like, lashing rods are employed today because they are safer to use, save time and are easier to stow away.

One version of a lashing rod is already known from the Swedish Patent Publication 7609564-5 (Published Specification 411,438). The lashing rod comprises one or several part rods that have to be adjusted to the length of the lashing, i.e. to the distance between the corresponding attachment elements, on the container and in the ship loading space, respectively. Precision adjustment of the lashing is effected with the aid a turnbuckle positioned at one end of the lashing rod. Consequently, the use of this prior-art lashing rod requires access to a supply of part rods of various lengths in order to allow adaptation of the lashing rods to containers of various dimensions.

In accordance with another embodiment, the lashing rod is shaped like a gigantic turnbuckle having a proportionally designed sleeve device (tightening device) or else having a sleeve device of unproportional length to provide larger intervals in the length of the lashing. These traditional "long stroke" turnbuckles cause operational problems. The bolt parts of the end fittings are short, making them difficult to handle when inserted in or removed from the container corner boxes. On the other hand, long bolt portions involve time-consuming "screwing" operations and also larger weight. In addition, they cause problem when the turnbuckle is to be stored in "position of rest".

The purpose of the subject invention is to provide a turnbuckle or lashing rod which may easily assume at least two widely different elongation conditions.

A further purpose of the invention is to provide a lashing rod which may be easily stowed away and eliminates the current problems in connection with storage in "position of rest".

Yet another purpose is to provide a turnbuckle or lashing rod which is comparatively easy to handle.

These purposes are achieved in accordance with the invention by means of a turnbuckle of the kind outlined in the introductory paragraph and which is characterised in that the tightening device comprises a pair of cooperating tightening members in nesting relationship, that each tightening member comprises one outer end piece and one inner end piece, that the second inner end piece is formed with a threaded through-hole for screw engagement with the threaded portion of the first fastening means, and in that the tightening device is arranged to assume at least two different elongation conditions, so that, in the shorter condition, the threaded part of the first fastening means is in screw engagement with the threaded hole of the second inner end piece and, in the longer condition, said last screw engagement is interrupted and the tightening members displaced in the longitudinal direction of the tightening device, thereby causing the inner faces of the two inner end pieces to come into abutting relationship.

Further developments of the invention will appear from the characteristic features defined in the dependent claims.

Preferred embodiments of the invention will be described for exemplifying purposes and with reference to the accompanying drawings, wherein:

FIG. 1 in a view from above and partly in cross-section illustrates one embodiment of the turnbuckle or lashing rod with the tightening device in a first shorter elongation condition;

FIG. 6 is an end view, illustrating the tightening member in accordance with FIGS. 4–5;

FIG. 7 is an end view of an alternative embodiment of the tightening member;

FIG. 8 is a lateral view showing a further alternative embodiment of the tightening member;

FIG. 9 is a plan view showing yet another alternative embodiment of the turnbuckle or lashing rod;

FIG. 10 is an end view of a modified turnbuckle or lashing rod in accordance with the invention;

FIG. 11 is a view similar to FIG. 1 but illustrates yet another alternative embodiment of the turnbuckle or lashing rod, and FIG. 12 is a partial lateral view illustrating a modified embodiment of the turnbuckle of FIG. 11.

Figure 1:
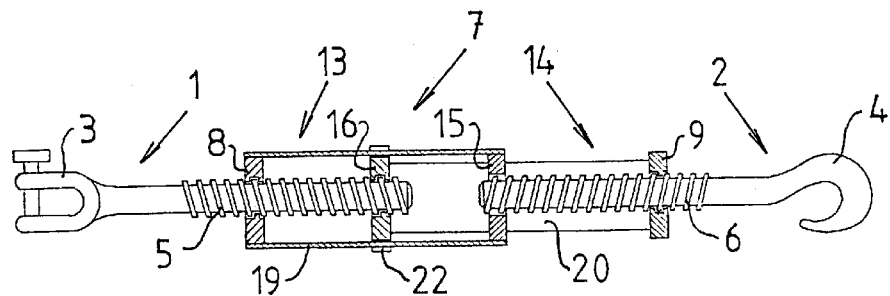

With reference initially to FIGS. 1–6, the turnbuckle or lashing rod comprises, in accordance with a preferred embodiment of the invention, a first fastening means 1 and a second fastening means 2, consisting of end fittings 3 and 4, respectively, and a rod-shaped part formed integrally therewith and having external threads 5 and 6, respectively. The end fittings could be in the shape of a shackle or hook and are intended to be attached to attachment elements (not shown) with which the container and ship are provided in a manner known per se. Each threaded portion 5 and 6 is in screw engagement with its associated one of the two outer end pieces 8 and 9 of a tightening device 7 by means of threaded through-holes 11 and 12, respectively, formed in the end pieces. The threaded portions 5 and 6 are in alignment and oppositely threaded, whereby rotation of the tightening device 7 in one direction causes the end fittings 3 and 4 to move closer to one another, thereby tensioning the lashing rod, whereas rotation in the opposite direction causes the end fittings to move apart, allowing the lashing rod to be released and the cargo to be unloaded. So far, the lashing rod thus operates as a conventional turnbuckle.

A novel feature particular to the inventive object is, however, that the tightening device 7 comprises a pair of cooperating tightening members 13 and 14 which are displaceable lengthwise. The tightening members which in accordance with this embodiment of the invention are practically identical, comprise, in addition to said outer end pieces 8, 9, also one inner end piece each, 15 and 16, formed with central through-holes 17 and 18, respectively. The two end pieces 8, 15 and 9, 16, respectively, of each tightening member 13, 14 are interconnected by means of a pair of facing elongate profile sections, flat bars or the like 19 and 20, respectively, see particularly FIGS. 4 and 5. The profile sections 19 of one of the tightening members are perpendicular to the profile sections 20 of the second tightening member; compare FIG. 6, or extend over an arc of a circle of approximately 90°; cf. FIG. 7. The feature distinguishing the two tightening members 13 and 14 from one another is that the hole 18 in one 16 of the inner end pieces may be forced into screw engagement relationship with the threaded part 5 of the fastening means 1 of the cooperating tightening member 13 while the diameter of hole 17 preferably exceeds that of the threaded part 6, precluding screw engagement between part 6 and hole 17 for reasons that will appear further on. As is easily understood it is, however, possible, under some circumstances, to establish screw engagement also between the part 6 and the hole 17, which does not affect the function of the tightening device in any other way than to make it somewhat more difficult to manipulate. As clearly apparent from FIGS. 1 and 2, the inner end piece 15 of the first tightening member 13 is placed between two end pieces 9 and 16 of the second tightening member 14, and vice versa.

As already mentioned, the lashing rod in accordance with the invention is arranged to have at least two entirely different lashing lengths for adaptation to different container sizes. In accordance with the embodiment above, the tightening device 7 may have two different elongation conditions, which then are precision-adjusted by suitable rotation of the tightening device as is common practice in connection with conventional turnbuckles.

Figure 2:
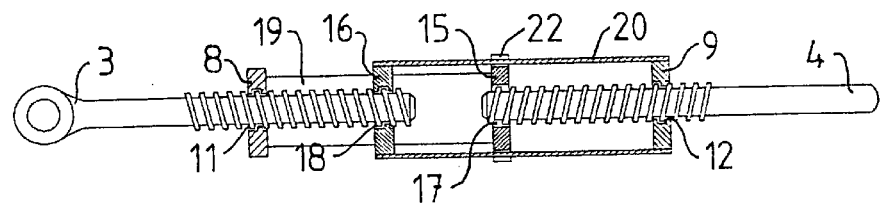
FIG. 2 is a lateral, partly cross-sectional view of the turnbuckle or lashing rod in said elongation condition.

In the shorter condition of the tightening device illustrated in FIGS. 1 and 2, the threaded portion 5 of the first fastening means 1 is in screw engagement with the threaded hole 18 formed in the inner end piece 16 of the second tightening member 14. According to choice, the engagement may occur in a position intermediate the two end pieces 8 and 15 of the first tightening member 13. When the outer end of the threaded portion 5 has been brought into screw engagement with said inner end piece 16 in the position chosen, the threaded portion 5 may then be screwed inwards further, without causing displacement of the end piece. In contrast thereto, the threaded portion 6 of the second fastening means 2 is not in screw engagement with inner end piece 15 of the first tightening member 13 because the diameter of the through-hole 17 of this latter end piece somewhat exceeds that of the threaded portion 6, but the hole may serve to guide said portion. The shorter length of the .tightening device 7 thus could be determined within the interval in which the threaded portion 5 is in screw engagement with the threaded hole 18 of the inner end piece 16. Once the shorter lengthwise condition of the tightening device, and thus of the lashing rod, is assumed, the tightening device is rotated to bring the end fittings closer to one another as a result of the engagement of their threaded portions 5, 6 with the corresponding threaded holes 11, 12 formed in the outer end pieces 8, 9, whereupon the container may be secured or lashed.

Figure 4:
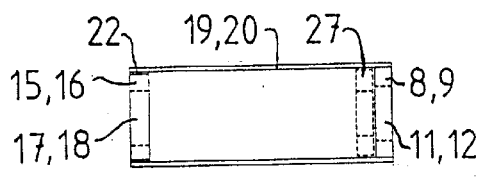
FIG. 4 illustrates in a view from above a tightening member incorporated in the tightening device in accordance with FIGS. 1–3.
Figure 5:
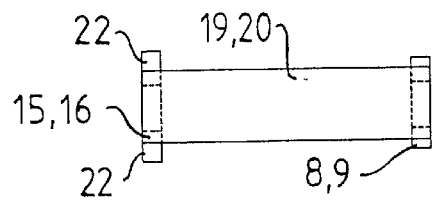
FIG. 5 is a lateral view illustrating the tightening member in accordance with FIG. 4.

In order to control the lenghtwise displacement of the tightening members 13 and 14 relatively to one another they are provided with guide means. As is illustrated particularly in FIG. 5, the guide means preferably are provided on or formed integrally with the inner end pieces 15 and 16. In this drawing figure the guide means are in the form of two pairs of lugs or flanges 22 projecting from the periphery of each inner end piece. The lugs 22 of each pair are mutually parallel and arranged to straddle and to slide along the elongate profile sections 19 and 20 of the cooperating tightening member; cf. FIGS. 1 and 2. Drawing FIGS. 4 and 5 illustrate two oppositely positioned pairs of lugs 22 but it is of course also possible to use only one pair of lugs or two diametrically oppositely positioned lugs on each end piece (not shown).

Figure 3:
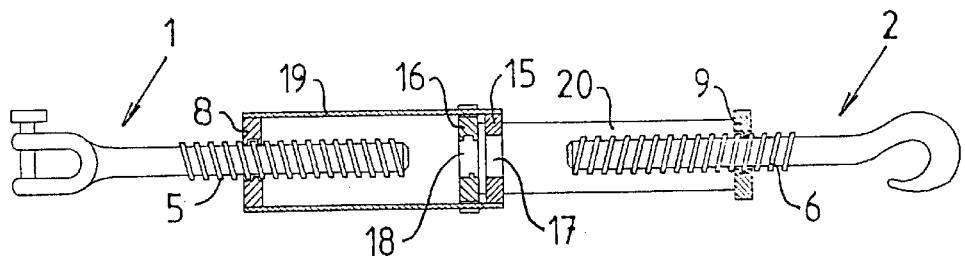
FIG. 3 is a view corresponding to that of FIG. 1, illustrating the turnbuckle or lashing rod with the tightening device in a second longer elongation condition.

In FIG. 3, the longer condition of the tightening device is shown. In this condition neither the threaded portion of fastening means 1 nor that of fastening means 2 is in engagement with the through-holes 17 and 18 of the inner end pieces 15 and 16. The inner faces of the two inner end pieces 15 and 16, i.e. the faces turned towards the associated outer end piece 8 and 9 of each tightening member 13 and 14 may now be brought into abutting relationship, the length of the tightening device 7 being determined by the lengths of the elongate profile sections 19 and 20. The lashing is effected in a manner indicated above, by rotating the tightening device by means of a suitable tool applied on one of the tightening members, which in turn causes the second tightening member to perform a rotary motion.

The above-mentioned guide means, viz. guide lugs 22, could also be shaped as a pair of pins 23 projecting centrally from each inner end piece 15 and 16, see FIGS. 8 and 9, and arranged to slide along associated, essentially lengthwise extending slits 24 formed in the elongate profile sections 19 and 20 of the cooperating tightening member. Like in the embodiment described above, the guide means on the inner end piece 15, 16 of one of the tightening members 13, 14 thus cooperate(s) with the elongate profile section 20, 19 of the other tightening member 14, 13.

In the embodiment of the invention shown in FIGS. 1–6, the tightening device is illustrated having square end pieces 8, 9, 15 and 16, but these pieces could have any optional shape, such as circular as suggested in FIG. 7. In connection therewith it is possible to arrange for the tightening members 13 and 14 to be restrictedly rotational relatively to one another. By configuring the above-mentioned slit 24 with one or several steps 25 one or both of the inner end pieces 15 and 16 may be equipped with pins 23 that may be retained by the steps 25, thus creating an intermediate elongation condition of the tightening device 7, permitting quicker operation of the lashing rod since the tightening device need not be rotated as much to effect lashing.

In accordance with a further embodiment of the lashing rod in accordance with the invention, one 13 of the tightening members may, if desired, be configured as a tubular sleeve and its inner end piece 15 be formed with an external profile or guide means configured to make it non-rotationally displaceable in the other tightening member 14, see FIG. 9. In accordance with this embodiment, the tightening members thus are not essentially identical but one tightening member 13 has a smaller, and optionally different, cross-section from the other tightening member 14.

In order to prevent or counteract penetration of objects or foreign particles into the tightening device interior also the other tightening member 14 in accordance with the embodiment of FIG. 9 advantageously is configured as a tubular sleeve, see FIG. 10, and preferably it is formed with the guide means 23, 24, 25 illustrated in FIG. 8.

In the case of the embodiments according to which both tightening members 13 and 14 are of cylinder shape it could be suitable to provide one of them with an abutment means for engagement with a tool by means of which the tightening device 7 is rotated. This feature is illustrated by a pair of protrusions 26 arranged in diametrically opposite positions on the tightening member 14 in FIG. 10.

In accordance with the embodiments described above it is likewise possible to form one or several of the end pieces with holes having a larger diameter than the threaded portions and to apply a separate nut means 27 interiorly of the associated hole for screw engagement with a threaded portion 5, 6, as indicated by the nut means 27 shown in dotted lines in FIG. 4 adjacent the outer end piece 8, 9, the nut means being non-rotationally arranged in the tightening device, for instance in any of the manners described in the aforegoing. Further, to lock the tightening device 7 a locking nut 28 may be provided on the threaded portion 6 against the external face of the outer end portion 9.

In accordance with the embodiments of the invention described hitherto, both fastening means 1 and 2 are in screw engagement with threaded holes 11 and 12 in the outer end pieces 8 and 9, respectively. In certain applications of the invention it is however preferable to arrange one fastening means 2 which cannot be moved into screw engagement position with an inner end piece 15, in rotatable engagement with the associated outer end piece 9 without being displaceable in the lengthwise direction of the tightening device 7. In this case the hole 17 formed in the inner end piece 15 may be eliminated, cf. FIG. 11. FIGS. 11 and 12 exemplify two different ways of application of this teaching.

Reference is now first made to FIG. 11 according to which the fastening means 2 and the hole 12 formed in the outer end piece 9 lack threads. Thus, the fastening means 2 consists of an end fitting 4 and a smooth rod-shaped portion 29 formed integrally therewith and terminating in a stopper means or head 31, preferably in the shape of an annular or cylindrically shaped member or a ball (not shown). The stopper means 31 which may be formed integrally with the rod-shaped portion 29 or be secured thereto in some suitable manner has an external diameter exceeding that of hole 12 and when exposed to traction loads it engages the inner face of the outer end piece 9, as is clearly evident from FIG. 11.

FIG. 12 illustrates schematically a modification according to which a slit 32 extends from the outer periphery of the outer end piece 9 and up to the smooth hole 12. The smooth, rod-shaped portion 29 of the fastening means 2 thus may be inserted laterally (in a direction essentially at right angles to the longitudinal axis of the tightening device) in the hole 12 and thereafter be displaced from the central part of the tightening device 7 along the longitudinal axis thereof, until the stopper means 31 in accordance with FIG. 11 is caused to engage the inner face of the outer end piece 9 as described above. Alternatively, and as suggested in FIG. 12, a recess 33 with a seat face thereon may be formed in the inner face of the end piece 9. Preferably, the slit 32 is shaped like an hourglass, a shape that may also be given to the hole 12, provided the end piece 9 has sufficient thickness.

The invention is not limited to the features described in the aforegoing or illustrated in the drawing Figures but could be varied within the scope of the appended claims.

What is claimed is:

1. A turnbuckle comprising:
   first and second fastening parts, said first fastening part having a first end fitting and a first rod-shaped portion, said second fastening part having a second end fitting and a second rod-shaped portion, at least said first rod-shaped portion being formed with external threads; and
   a tightening device including first and second tightening members in telescoping relationship with each other, each tightening member having an outer end piece and an inner end piece,
   wherein the outer end piece of at least said first tightening member has a threaded through-hole therein, said first rod-shaped portion being in screw engagement with said through-hole,
   said inner end piece of said second tightening member is formed with a threaded through-hole for screw engagement with said first rod-shaped portion, and
   said tightening device is constructed to assume at least a shorter and a longer elongation condition, so that, in the shorter condition, said first rod-shaped portion is in screw engagement with the threaded through-hole of the inner end piece of said second tightening member and, in the longer condition, said first rod-shaped portion is not in screw engagement with the threaded through-hole of the inner end piece of said second tightening member, a spacing between the outer end pieces of the first and second tightening members in a longitudinal direction of the tightening device is greater than said spacing in the shorter condition, and the inner end pieces of said first and second tightening members are in abutting relationship.

2. A turnbuckle as claimed in claim 1, characterised in that said second rod-shaped portion is formed with external threads, that the outer end piece of said second tightening member is formed with a threaded through-hole to receive the second rod-shaped portion in screw engagement, and in that the inner end piece of said first tightening member has a through-hole.

3. A turnbuckle as claimed in claim 2, further characterised in that the through-hole of the inner end piece of said first tightening member has a diameter exceeding a diameter of the threads of said second rod-shaped portion.

4. A turnbuckle as claimed in claim 1, characterised in that said outer and inner end pieces of each tightening member are interconnected by a pair of facing elongate profile sections.

5. A turnbuckle as claimed in claim 4, characterised in that the inner end piece of each tightening member comprises two opposed guide portions that cooperate with the profile sections of the other tightening member.

6. A turnbuckle as claimed in claim 5, characterised in that each of said guide portions comprises a lug projecting from a periphery of its associated inner end piece, said lug being arranged to slide along a longitudinal face of one of the profile sections of said other tightening member.

7. A turnbuckle as claimed in claim 5, characterised in that each of said guide portions comprises a pin projecting centrally from its associated inner end piece, said pin being arranged to slide along an essentially longitudinally extending, associated slit formed in one of the profile sections of said other tightening member.

8. A turnbuckle as claimed in claim 7, characterised in that said slit is formed with at least one step-like portion extending essentially at right angles to the longitudinal extension of its associated profile section and defining a third elongation condition of said tightening device, intermediate the shorter and longer conditions.

9. A turnbuckle as claimed in claim 1, characterised in that said inner and outer end pieces have a square cross-sectional configuration.

10. A turnbuckle as claimed in claim 1, characterised in that said inner and outer end pieces have a circular cross-sectional configuration.

11. A turnbuckle as claimed in claim 1, characterised in that one said tightening member is in the shape of a tubular sleeve which is arranged inside the other said tightening member so as to be non-rotationally displaceable therein.

12. A turnbuckle as claimed in claim 11, characterised in that the other tightening member is in the shape of a tubular sleeve and is formed with an externally actuable portion for rotating the tightening device.

13. A turnbuckle as claimed in claim 1, characterised in that at least one of the through-hole of the outer end piece of said second tightening member and the rod-shaped portion of the second fastening part is smooth, in that the rod-shaped portion of the second fastening part has a stopper arranged on an end remote from its associated end fitting, and in that the second fastening part is free to rotate inside the through-hole of the outer end piece of said second tightening member, and when in use, to be non-displaceable in its lengthwise direction.

14. A turnbuckle as claimed in claim 13, characterised in that a slit extends from an outer periphery of the outer end piece of said second tightening member up to the through-hole therein for lateral insertion of said second rod-shaped portion into that through-hole.

15. A lashing rod for securing a load to a surface, comprising a turnbuckle as claimed in claim 1.

16. A lashing rod for securing a load to a surface, comprising a turnbuckle as claimed in claim 2.

17. A lashing rod for securing a load to a surface, comprising a turnbuckle as claimed in claim 8.

18. A lashing rod for securing a load to a surface, comprising a turnbuckle as claimed in claim 13.

19. A method of holding a load on a ship's deck, comprising securing the load to the ship's deck with a lashing rod including a turnbuckle as claimed in claim 1.

20. A method of holding a load on a ship's deck, comprising securing the load to the ship's deck with a lashing rod including a turnbuckle as claimed in claim 2.

21. A method of holding a load on a ship's deck, comprising securing the load to the ship's deck with a lashing rod including a turnbuckle as claimed in claim 8.

22. A method of holding a load on a ship's deck, comprising securing the load to the ship's deck with a lashing rod including a turnbuckle as claimed in claim 13.

* * * * *